(12) United States Patent
Ogita et al.

(10) Patent No.: US 8,602,004 B2
(45) Date of Patent: Dec. 10, 2013

(54) FUEL VAPOR PROCESSING APPARATUS

(75) Inventors: Tamotsu Ogita, Obu (JP); Takashi Mani, Hekinan (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 223 days.

(21) Appl. No.: 13/082,465

(22) Filed: Apr. 8, 2011

(65) Prior Publication Data

US 2011/0247595 A1 Oct. 13, 2011

(30) Foreign Application Priority Data

Apr. 9, 2010 (JP) ................................ 2010-090245
Apr. 21, 2010 (JP) ................................ 2010-097730

(51) Int. Cl.
*F02M 33/02* (2006.01)

(52) U.S. Cl.
USPC ........... 123/521; 123/516; 123/518; 123/519; 123/520

(58) Field of Classification Search
USPC ................................ 123/516–522
See application file for complete search history.

(56) References Cited

U.S. PATENT DOCUMENTS

2011/0214646 A1* 9/2011 Makino ..................... 123/518
2011/0247595 A1* 10/2011 Ogita et al. ............... 123/521
2011/0308302 A1* 12/2011 Makino ..................... 73/40.7

FOREIGN PATENT DOCUMENTS

| JP | 2002-235608 A | 8/2002 |
| JP | 2002235608 A | 8/2002 |
| JP | 2002332921 | 11/2002 |

OTHER PUBLICATIONS

Japanese Office Action mailed Jul. 30, 2013, corresponding to Japanese Patent Application No. 2010-097730; with English language translation.

* cited by examiner

*Primary Examiner* — Stephen K Cronin
*Assistant Examiner* — Joseph Dallo
(74) *Attorney, Agent, or Firm* — Ladas & Parry, LLP

(57) ABSTRACT

According to the present teaching, a fuel vapor processing apparatus includes a fuel tank, a canister capable of adsorbing fuel vapor produced in the fuel tank, a fuel pump disposed within the fuel tank, a fuel recovery device configured to recover the fuel vapor from the canister into the fuel tank, and a control device configured to stop recovery of the fuel vapor by the fuel recovery device based on at least one of parameters representing the amount of the fuel vapor remaining within the canister.

19 Claims, 12 Drawing Sheets

FUEL VAPOR PROCESSING APPARATUS

This application claims priority to Japanese patent application serial numbers 2010-090245 and 2010-097730, the contents of which are incorporated herein by reference.

BACKGROUND OF THE INVENTION

1. Field of the Invention

The present invention relates to fuel vapor processing apparatus for processing fuel vapor that may be produced within a fuel tank.

2. Description of the Related Art

Known fuel vapor processing apparatus generally include a fuel tank, a canister for adsorbing fuel vapor that may be produced in the fuel tank, and an aspirator that produces a negative pressure by a part of fuel discharged from a fuel pump disposed within the fuel tank. Therefore, fuel adsorbed by the canister can be recovered into the fuel tank by utilizing the negative pressure produced by the aspirator. Such a fuel vapor processing apparatus is disclosed, for example, in Japanese Laid-Open Patent Publication No. 2002-235608. In the fuel vapor processing apparatus disclosed in this publication, a jet pump serving as an aspirator indirectly communicates with the fuel pump via a pressure regulator. As the fuel pump is driven during running of an automobile, surplus fuel discharged from the fuel pump is released into the fuel tank via the pressure regulator. The surplus fuel released from the pressure regulator is introduced into the aspirator for producing a negative pressure. The aspirator is disposed in the midway of a recovery passage. A front opening of the recovery passage, i.e., a discharge opening for discharging the fuel recovered from the canister and the surplus fuel introduced into the aspirator is submerged within the fuel stored within the fuel tank.

This kind of fuel vapor processing apparatus is used for preventing potential damage to the fuel tank due to increase of the internal pressure that may be caused by the production of the fuel vapor. However, in the case of the arrangement of the above publication, the aspirator normally operates continuously as long as the fuel pump is driven to release the surplus fuel. Therefore, even after the fuel vapor adsorbed by the canister has been completely recovered, the aspirator still continuously operates. In addition, because the adsorbed fuel and the surplus fuel recovered by the aspirator are discharged into the fuel stored within the fuel tank, unpleasant and unnecessary bubbling may occur in the fuel of the fuel tank even after completion of recovery of the fuel. This may enhance the production of fuel vapor within the fuel tank and the internal pressure within the fuel tank may be unnecessarily increased.

Further, in the case of the arrangement of the above publication, the aspirator communicates with the fuel pump via the pressure regulator. This means that the surplus fuel is introduced into the aspirator from the pressure regulator. Therefore, the flow rate of the fuel introduced into the aspirator may become unstable, leading to unstable ability for recovering the fuel. Therefore, it may be considered to make direct communication between the aspirator and the fuel pump such that a part of the fuel for feeding to the engine under pressure by the fuel pump is directly introduced into the aspirator. However, because the aspirator continuously operates even after completion of recovery of the fuel, an amount of the fuel that is more than necessary may be introduced into the aspirator to adversely affect to the stability in supplying the fuel to the engine. For example, a maximum amount of the fuel capable of being supplied to the engine may be reduced by the amount of fuel introduced into the aspirator. Therefore, it may be possible to cause shortage of supply of the fuel to the engine when the engine operating condition requires a large amount of fuel.

Further, the fuel vapor processing apparatus of the above publication includes a heater that heats inside of the canister for effectively desorbing the fuel from the canister during recovery of the fuel. Although not explicitly disclosed in this publication, an engine control unit (ECU) is generally used for controlling the operation of a process system of this kind of fuel vapor processing apparatus.

In the case of the fuel vapor processing apparatus of the above publication, the process system is operated for processing the fuel vapor as long as the engine operates. Thus, the process system is operated regardless of the amount of the fuel vapor adsorbed within the canister (i.e., the amount of the fuel remaining within the canister). Therefore, even after the fuel within the canister has been actually substantially completely desorbed, the process system still continues to operate. This leads to unnecessary consumption of an electric power needed for operating the heater, resulting in unnecessary consumption of the fuel. In order to avoid this problem, it may be possible to control the fuel pump to process the fuel vapor independently of the operation of the engine. However, also in this case, it may be possible that the fuel pump continues to be driven even after completion of recovery of the fuel. Therefore, this may lead to unnecessary consumption of electric power needed for operating the fuel pump in addition to the heater.

The value of the negative pressure produced by the aspirator may depend on the amount of the fuel introduced into the aspirator. Thus, the value of the negative pressure increases as the amount of the fuel introduced into the aspirator increases. On the other hand, the value of the negative pressure decreases as the amount of the fuel introduced into the aspirator decreases. In the case of the arrangement of the above publication, the surplus fuel discharged from the pressure regulator is introduced into the aspirator. In other words, the fuel pump indirectly communicates with the aspirator via the pressure regulator. For this reason, the amount of fuel introduced into the aspirator tends to be unstable, leading to unstable negative pressure. Therefore, the remaining amount of the fuel within the canister for an accumulated operation time of the process system tends to be unstable. Hence, it is difficult to determine the remaining amount of the fuel within the canister and it is also difficult to appropriately determine when the process system is to be stopped Therefore, there is a need in the art for a further improved fuel vapor processing apparatus.

SUMMARY OF THE INVENTION

According to the present teaching, a fuel vapor processing apparatus includes a fuel tank, a canister capable of adsorbing fuel vapor produced in the fuel tank, a fuel pump disposed within the fuel tank, a fuel recovery device configured to recover fuel vapor from the canister into the fuel tank, and a control device configured to stop recovery of the fuel vapor by the fuel recovery device based on at least one of parameters representing the amount of the fuel vapor remaining within the canister. The at least one parameter may be a pressure within the canister, a temperature within the canister, or a time elapsed after starting recovery of the fuel vapor, or a combination of two or more of these parameters.

DETAILED DESCRIPTION OF THE INVENTION

Figure 1:
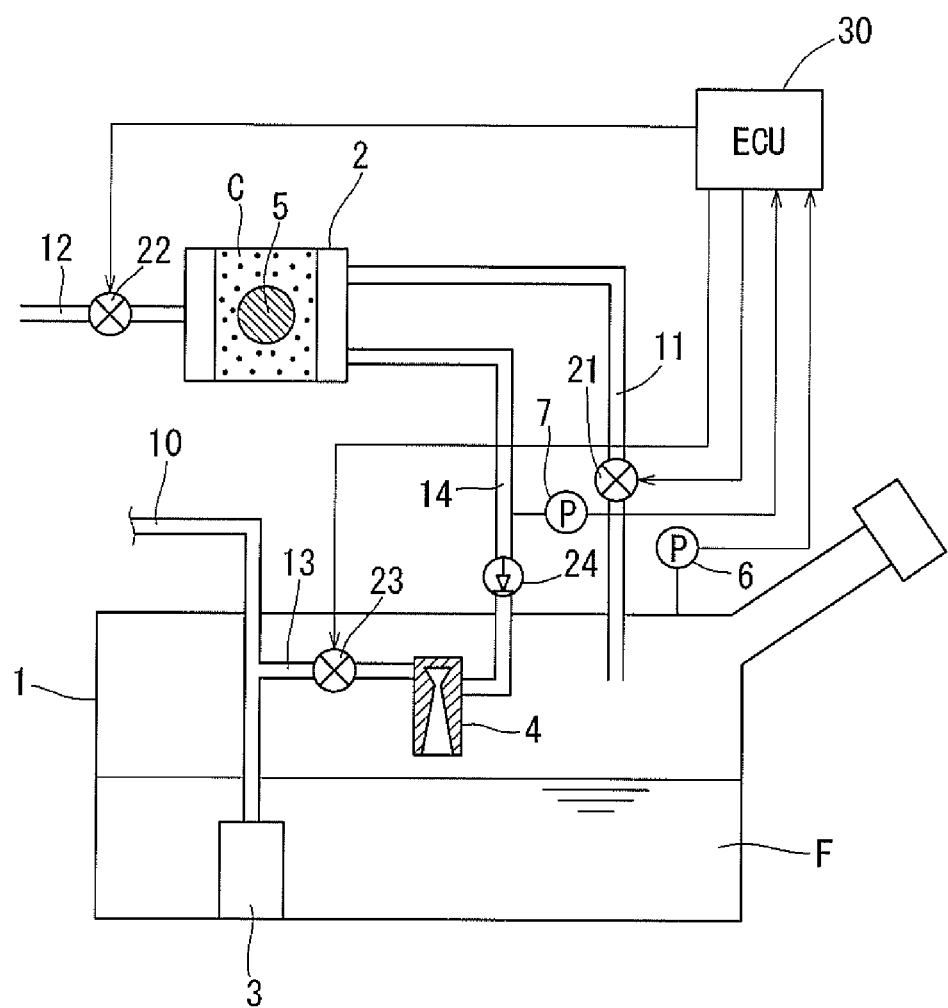
FIG. 1 is a schematic view showing a fuel vapor processing apparatus according to a first example, the basic construction of the fuel processing apparatus being applied to also second and third examples.

Each of the additional features and teachings disclosed above and below may be utilized separately or in conjunction with other features and teachings to provide improved fuel vapor processing apparatus. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one example, a fuel vapor processing apparatus includes a fuel tank, a canister capable of adsorbing fuel vapor produced in the fuel tank, a fuel pump disposed within the fuel tank and an aspirator configured to produce a negative pressure by a part of fuel discharged from the fuel pump and introduced into the aspirator, so that the fuel vapor adsorbed by the canister can be recovered into the fuel tank by utilizing the negative pressure. The apparatus further includes a pressure sensor detecting a pressure within the canister, a determination device configured to determine completion of recovery of the fuel vapor from within the canister based on information detected by the pressure sensor, and an introduction stop device configured to stop introduction of the part of fuel into the aspirator based on the determination made by the determination device.

With this arrangement, incorporation of the fuel into the aspirator can be stopped when the recovery of the fuel vapor from the canister is completed. Therefore, it is possible to prevent unnecessary discharge of gas or fuel into the fuel tank. Hence, the fuel vapor can be reliably recovered without causing no bubbling of fuel within the fuel tank and without causing unnecessary increase of the internal pressure of the fuel tank after completion of recovery of the fuel vapor.

The fuel pump and the aspirator may directly communicate with each other. The direct communication between the fuel pump and the aspirator may stabilize the amount of introduction of the fuel into the aspirator and also stabilize the pressure value of the negative pressure produced by the aspirator or the fuel vapor recovery performance. The stabilized recovery performance may contribute to correctly determine the completion of recovery of the fuel vapor. In this connection, the introduction stop device may include a fuel introduction control valve configured to control introduction of the part of fuel from the fuel pump into the aspirator. The fuel introduction control valve is closed to stop introduction of the part of fuel into the aspirator if the determination device determines that recovery of the fuel vapor has been completed. Therefore, it is possible to reliably prevent the fuel from being introduced into the aspirator after completion of recovery of the fuel vapor. Hence, it is possible to avoid a potential adverse affect to the flow of the fuel that is supplied to the engine.

Figure 4:
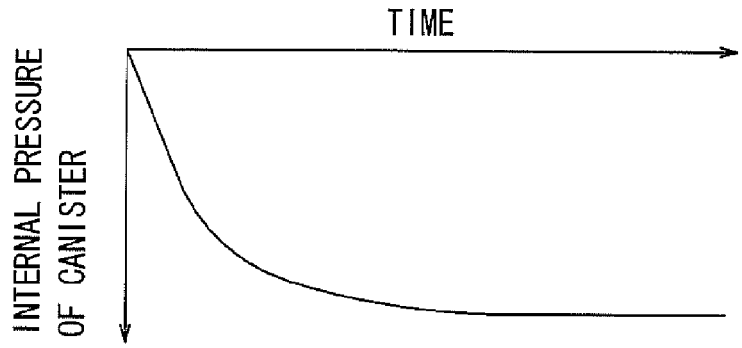
FIG. 4 shows a schematic graph showing change of an internal pressure of a canister with time.

Normally, the internal pressure of the canister is kept at the atmospheric pressure. As the aspirator is operated to apply a negative pressure to the inside of the canister, the fuel adsorbed by the canister is desorbed to be recovered, so that the internal pressure of the canister is lowered as time passes as shown in FIG. 4. After the fuel vapor has been recovered as much as possible, the internal pressure of the canister is saturated and stabilized. In light of this characteristic of the internal pressure of the canister, the determination device may determine the completion of recovery of the fuel vapor according to the following first to third measures that can be incorporated separately or in combination.

According to the first measure, the determination device determines that recovery of the fuel vapor has been completed when a negative pressure within the canister has been stabilized. According to the second measure, the determination device determines that recovery of the fuel vapor has been completed when a time required for a negative pressure within the canister until reaching to a threshold value for starting to be stabilized has become equal to or less than a reference time. According to the third measure, the determination device determines that recovery of the fuel vapor has been completed when a negative pressure within the canister has reached a reference pressure that is previously set. The first to third measures require only the detection of the pressure within the canister for determining the completion of recovery of the fuel vapor. In particular, according to the second and third measures, it is possible to presume that the pressure will be stabilized after reaching the reference time or the reference pressure, and therefore, it is not necessary to monitor whether or not the pressure has been actually stabilized after that. Therefore, it is possible to easily determine the completion of recovery.

There is also a characteristic that the evaporation heat of the fuel vapor lowers the temperature within the canister as the fuel vapor is desorbed from within the canister. The lowering of temperature stops when the recovery of the fuel vapor is completed. Therefore, the fuel vapor processing apparatus may include a temperature sensor capable of detecting a temperature within the canister, and the determination device may determine the completion of recovery of the fuel vapor from within the canister based on the information detected by the temperature sensor in addition to the information detected by the pressure sensor. With this arrangement, because the determination is made based on the temperature in addition to the pressure, it is possible to further improve the determination accuracy.

In general, an adsorption material is filled within the canister in order to adsorb the fuel vapor. The adsorption material has such a characteristic that desorption efficiency becomes higher as the temperature increases. However, the evaporation heat may lower the temperature as the fuel vapor is desorbed. Therefore, the fuel vapor processing apparatus may further include a heater disposed within the canister for generating heat during recovering of the fuel vapor. With this arrangement, the desorption efficiency can be improved. Hence, it is possible to minimize the time required for recovering the fuel vapor and to eventually minimize the period of time of operation of the aspirator.

Although the pressure sensor may be provided directly at the canister, it may be possible to provide the pressure sensor in a recovery passage that communicates between the canister and the fuel tank. In the case that the pressure sensor is provided directly at the canister, there is a possibility that different pressure values may result with change of the position of the pressure sensor because the pressure within the canister is not necessary uniform depending on the internal structure of the canister. This problem may not occur if the pressure sensor is provided in the recovery passage. Therefore, it is possible to accurately detect the internal pressure of the canister.

In another example, a fuel vapor processing apparatus includes a fuel tank, a canister capable of adsorbing fuel vapor produced in the fuel tank, a fuel pump disposed within the fuel tank, an aspirator configured to produce a negative pressure by a part of fuel discharged from the fuel pump and introduced into the aspirator, and a system controller configured to control the operation of a process system of the fuel vapor. The process system is configured to recover the fuel vapor adsorbed by the canister into the fuel tank by utilizing the negative pressure produced by the aspirator. The system controller stops the operation of the process system upon determination of an event that an amount of the fuel vapor adsorbed within the canister has become equal to or less than a predetermined value.

If the amount of the fuel vapor adsorbed within the canister has become equal to or less than the predetermine value, it is possible to presume that substantially all the fuel vapor has been desorbed and recovered. When this event is determined, the process system is stopped. Therefore, unnecessary consumption of energy, e.g., an electric power, by the process system can be avoided. Eventually, it is possible to avoid unnecessary consumption of the fuel.

The fuel pump and the aspirator may directly communicate with each other. On this condition, the system controller may determine an amount of the fuel vapor absorbed within the canister based on an accumulative operation time of the process system elapsed after starting the operation of the process system. If the fuel pump and the aspirator directly communicate with each other, the amount of introduction of fuel into the aspirator may be constant and stable. Therefore, the negative pressure produced by the aspirator may be also stable. In such a case, the amount of the residual fuel vapor within the canister decreases by a constant ratio with the accumulative operation time of the process system. Hence, simply measuring the accumulative operation time of the process system allows identifying the fuel vapor adsorption amount (residual amount) within the canister.

As noted above, the fuel vapor adsorption amount is determined based on the accumulative operation time of the process system, and the operation of the process system is stopped when the fuel vapor has been substantially completely desorbed and recovered. This means that the process system continues to operate until a predetermined condition is satisfied even after the engine has been stopped. Therefore, the stop timing of the process system is not directly related to the operating condition of the engine. For this reason, in some cases, the fuel pump still continues to operate until completion of recovery of the fuel vapor even after the engine has been stopped. However, because the fuel pump is certainly stopped after recovery of the fuel vapor, it requires only a minimum amount of electric power for recovering the fuel vapor. Therefore, it is possible to avoid unnecessary consumption of an electric power after that.

As described above, direct communication between the fuel pump and the aspirator may lead to stabilization of the fuel vapor residual amount with regard to variation with time. Therefore, if a map showing variation in an amount of the fuel vapor adsorbed within the canister in relation to an accumulative operation time of the process system is stored in the system controller, the system controller can easily determine the amount of the fuel vapor adsorbed within the canister based on the map.

In such a case, the system controller may stop the operation of the process system when the accumulative operation time of the process system has become equal to a reference time. With this arrangement, it is not necessary to directly detect the residual amount of the fuel vapor, and therefore, a control program necessary for operating the process system can be simplified.

The operation of the process system may be started in response to completion of filling of fuel into the fuel tank. During running or parking of the automobile (i.e., other than during filling of fuel into the fuel tank), the fuel vapor is sequentially introduced into the canister and adsorbed by the canister. However, during filling of the fuel, a large amount of fuel vapor may be introduced into the canister in a short time. Therefore, starting the operation of the process system in response to completion of filling the fuel enables to reliably desorb and recover the fuel vapor at the time the recovery of the fuel vapor is most necessary. It is also possible to reliably recover the fuel vapor after filling the fuel before the next fuel filling operation.

Typically, the canister includes an adsorption material filled within the canister for adsorbing the fuel vapor. The adsorption material may have such a characteristic that a fuel vapor adsorption ability varies with change of temperature. Therefore, the rate of change of the fuel vapor residual amount may vary with time. For this reason, a temperature sensor configured to detect a temperature within the canister may be provided, so that the system controller can correct the reference time based on the temperature detected by the temperature sensor. With this arrangement, the fuel vapor residual amount may reliably become to be equal to or less than the predetermined value at the reference time irrespective of change of temperature within the canister.

The fuel vapor processing apparatus may further include a heater configured to heat inside of the canister, and the system controller may be configured to operate the heater in response to the operation of the process system. This arrangement is advantageous because the fuel vapor desorption ability of the adsorption material becomes higher as the temperature increases. Therefore, it is possible to improve the desorption efficiency of the fuel vapor and to minimize the time required for processing the fuel vapor. The system controller may stop the operation of the heater in response to stopping of the operation of the process system. With this arrangement, it is possible to avoid unnecessary consumption of an electric power by the heater after stopping of the operation of the process system.

First Example

A first example will be described with reference to FIGS. 1 to 4. Referring to FIG. 1, a fuel vapor processing apparatus of this example generally includes a fuel tank 1 storing fuel F therein, a canister 2 for adsorbing fuel vapor that may be produced within the fuel tank 1, and an aspirator 4 that can produce a negative pressure by a part of fuel discharged from a fuel pump 3 and introduced into the aspirator 4.

The fuel tank 1 is configured as a substantially sealed container. The fuel pump 3 is disposed within the fuel tank 1 and feeds fuel F to an engine (not shown) under pressure via a fuel supply passage 10. An adsorption material C is filled within the canister 2. The adsorption material C may be activated carbon or any other material that can allow passage of air but can adsorb the fuel vapor and allow desorption of the fuel vapor. A heater 5 is disposed within the canister 2 for heating the adsorption material C. The adsorption material C may have such a characteristic that the amount of adsorption of a specific component (fuel vapor in this example) decreases as the temperature increases, while the amount of adsorption of the specific component increases as the temperature decreases. Therefore, it is preferable that the temperature of the adsorption material is as higher as possible for desorbing the fuel vapor from the adsorption material C. However, when the fuel vapor is desorbed from the adsorption material C, the temperature of the adsorption material C may be lowered by the evaporation heat of the fuel. Therefore, it is possible to improved the desorption efficiency by heating the adsorption material C by the heater 5 during desorption of the fuel from the adsorption material C.

The fuel tank 1 and the canister 2 communicate with each other via an adsorption vapor passage 11. An adsorption vapor passage valve 21 is provided in the adsorption vapor passage 11 and serves as an opening and closing device for switching between a communicating condition and an interrupting condition of the adsorption vapor passage 11. An atmospheric passage 12 having one end opened into the atmosphere is connected to the canister 2. Also, an atmospheric passage valve 22 is provided in the atmospheric passage 12 and serves as an opening and closing device for switching between a communicating condition and an interrupting condition of the atmospheric passage 12. A pressure sensor 6 is provided at the fuel tank 1 for detecting the internal pressure of the fuel tank 1.

One end of a branch passage 13 is connected to the fuel supply passage 10 and the other end of the branch passage 13 is connected to the aspirator 4. Therefore, the aspirator 4 directly communicates with the fuel pump 3 through the fuel supply passage 10 and the branch passage 13. A fuel introduction control valve 23 is provide in the branch passage 13 for switching between a fuel introduction condition for introduction of fuel into the aspirator 4 and an interrupting condition, so that timing of introduction of fuel into the aspirator 4 can be controlled by controlling the fuel introduction control valve 23. A recovery passage 14 is connected to the aspirator 4 and communicates with the canister 2. A check valve 24 is provided in the recovery passage 14 for preventing backflow of the fuel from the aspirator 4 toward the canister 2. A negative pressure sensor 7 is provided in the recovery passage 14 for detecting the internal pressure of the canister 2. For the negative pressure sensor 7 and the pressure sensor 6 may have the same construction.

Detection signals from the pressure sensor 6 and the negative pressure sensor 7 are inputted into an engine control unit (ECU) 30 that may have a CPU, a ROM and a RAM, etc. The ROM may store a predetermined control program, so that the CPU controls the operation timings of various components of the fuel vapor processing apparatus according to the control program based on the detection signals from the sensors 6 and 7 and any other input signals. In this example, the adsorption vapor passage valve 21, the atmospheric passage valve 22 and the fuel introduction control valve 23 are solenoid valves and the opening and closing timings of these valves are control by the ECU 30.

Figure 2:
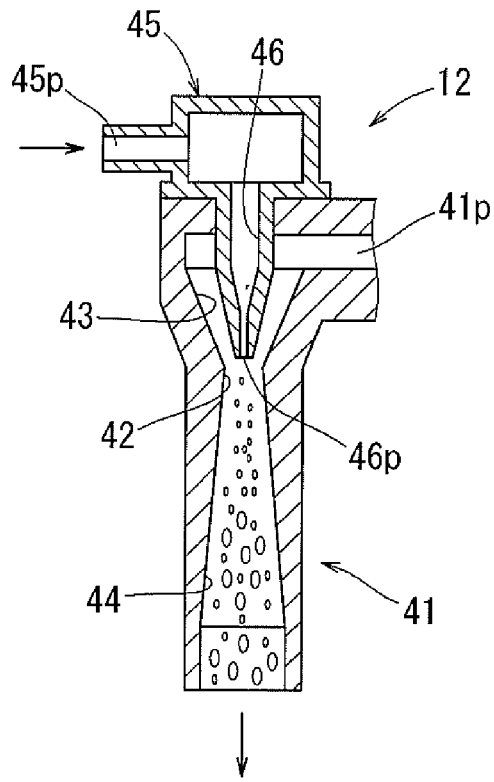
FIG. 2 is a vertical sectional view of an aspirator shown in FIG. 1.

As shown in FIG. 2, the aspirator 4 has a venturi portion 41 and a nozzle portion 45. The venturi portion 41 includes a throttle 42, a pressure reduction chamber 43, a diffuser region 44 and a suction port 41p that are defined within the venturi portion 41. The pressure reduction chamber 43 is disposed on an upstream side of the throttle 42 with respect to the flow of the fuel and is tapered toward the throttle 42. The diffuser region 44 is disposed on a downstream side of the throttle 42 with respect to the flow of the fuel and is gradually enlarged in a direction away from the throttle 42. The reduction chamber 43, the throttle 42 and the diffuser region 44 have the same central axis. The suction port 41p communicates with the pressure reduction chamber 43. The recovery passage 14 is connected to the suction port 41p. The nozzle portion 45 is connected to the upstream side of the venturi portion 41. The nozzle portion 45 includes an introduction port 45p for introducing fuel into the aspirator 4, and a nozzle body 46 for injecting the introduced fuel. The branch passage 13 is connected to the introduction port 45p. The nozzle body 46 is coaxially disposed within the pressure reduction chamber 43. The nozzle body 46 has an injection opening 46p that is opposed to the throttle 42.

Therefore, a part of fuel F discharged from the fuel pump 3 flows through the fuel supply passage 10 into branch passage 13 and further into the aspirator 4 via the fuel introduction port 45p. Then, the introduced fuel is injected from the nozzle body 46 and flows axially through the central portions of the throttle 42 and the diffuser section 44 at a high speed. Due to this flow of the fuel, a negative pressure is produced within the pressure reduction chamber 43 by a venturi effect, so that a suction force is applied into the suction port 41p and further into the recovery passage 14. Therefore, a gas (a mixture of air and fuel vapor form the canister 2 in this example) is drawn from the recovery passage 14 via the suction port 41p. The gas is then mixed with the fuel injected from the nozzle body 46, and the mixed gas is thereafter discharged from the diffuser section 44.

A process mechanism of the fuel vapor processing apparatus of this example will now be described. In this example, the CPU 30 performs all the controls that will be described below. During parking of the automobile, the atmospheric passage valve 22 is opened, while the adsorption vapor passage valve 21 and the fuel introduction control valve 23 are closed. On the other hand during filling of fuel into the fuel tank 1, the adsorption vapor passage valve 21 is opened. The adsorption vapor passage vale 21 also may be opened when the pressure sensor 6 detects an event that the internal pressure of the fuel tank 1 exceeds a predetermined value (e.g., 5 kPa), for example, due to increase of fuel temperature that may be caused as the external temperature increases. With this selective opening of the adsorption vapor passage vale 21, the fuel vapor can be selectively adsorbed or captured by the adsorption material C within the canister 2. The remaining air passes through the adsorption material C and is thereafter dissipated into the atmosphere via the atmospheric passage 12. Therefore, the pressure within the fuel tank 1 can be released to prevent potential damage of the fuel tank 1 while atmospheric pollution can be avoided. The adsorption vapor passage valve 21 is closed when the pressure sensor 6 detects an event that the internal pressure within the fuel tank 1 has been lowered to a predetermined pressure (e.g., the atmospheric pressure).

Figure 3:
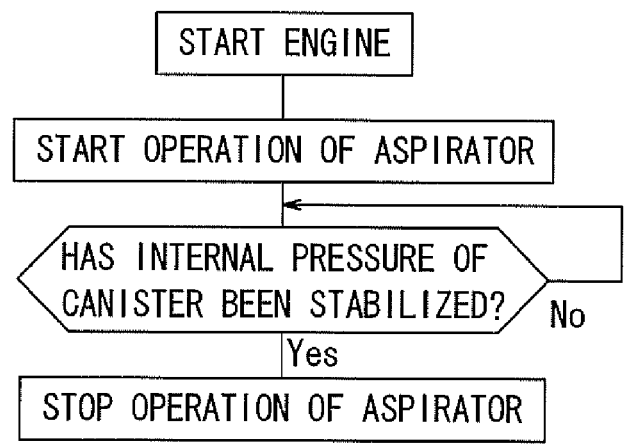
FIG. 3 is a flowchart of a control performed by an ECU shown in FIG. 1.

Next, a fuel vapor process mechanism during running of the automobile will be described. Referring to FIG. 3, when the engine is started (in other words, when the fuel pump 3 is started to be driven), the aspirator 4 starts to operate. More specifically, when the engine is started, the fuel introduction control valve 23 is opened. Then, a part of fuel F discharged from the fuel pump 3 is introduced into the aspirator 4 from the fuel supply passage 19 via the branch passage 13. As a result, a negative pressure is produced at the aspirator 4 and is applied to inside of the canister 2 through the recovery passage 14. The heater 5 is heated simultaneously with starting the aspirator 4. In addition, simultaneously with opening the fuel introduction control valve 23, the atmospheric passage valve 22 is closed. Because the adsorption vapor passage valve 21 is still closed, the inside of the fuel tank 1 and the inside of the canister 2 are brought to be closed spaces.

As the negative pressure from the aspirator 4 is applied to inside of the canister 2, the fuel vapor adsorbed by the adsorption material C within the canister 2 is drawn to be desorbed. Because the heater 5 heats the adsorption material C, desorption and recovery of the fuel vapor can be enhanced. At the beginning of desorption of fuel vapor, the pressure inside of the canister 2 defining a closed space is gradually lowered as shown in FIG. 4. The desorbed fuel vapor is recovered into the fuel tank 1 via the recovery passage 14 and the aspirator 4. When the fuel vapor has been desorbed and recovered from within the canister 2 to a maximum amount, the internal pressure of the canister 2 is saturated and becomes stable under a negative pressure condition. The negative pressure sensor 7 monitors this change of internal pressure of the canister 2. When the negative pressure sensor 7 detects an event that the negative pressure within the canister 2 has become stable, the ECU 30 (more specifically, the CPU) determines that the recovery of the fuel vapor has been completed. Then, the fuel introduction control valve 23 is closed, so that the operation of the aspirator 4 is stopped. In this way, this example is related to a specific method of determining completion of recovery of the fuel vapor. Even after stopping the operation of the aspirator 4, the inside of the canister 2 and the inside of the recovery passage 14 may still have a negative pressure. However, the check valve 24 may prevent potential backflow of the fuel from the aspirator 4 into the canister 2.

As described above, in this example, the aspirator 4 operates until completion of recovery of the fuel vapor, and therefore, the fuel vapor can be reliably recovered. Still, the aspirator 4 stops its operation after completion of recovery of the fuel vapor. Therefore, no unnecessary bubbling may occur in fuel F within the fuel tank 1. As a result, it is possible to prevent unnecessary increase of the internal pressure of the fuel tank 1 after completion of recovery of the fuel vapor. Further, because introduction of the fuel from the fuel pump 3 into the aspirator 4 stops after completion of recovery of the fuel vapor, it is possible to stably supply the fuel to the engine. It may be possible that the fuel temperature increases due to increase of the external temperature or by a heat produced by the fuel pump 3 during driving of the fuel pump 3. If the pressure sensor 6 detects an event that the internal pressure of the fuel tank 1 has increased to reach a predetermined value, the adsorption vapor passage valve 21 and the atmospheric passage valve 22 are opened to release the pressure within the fuel tank 1.

Second Example

Figure 5:
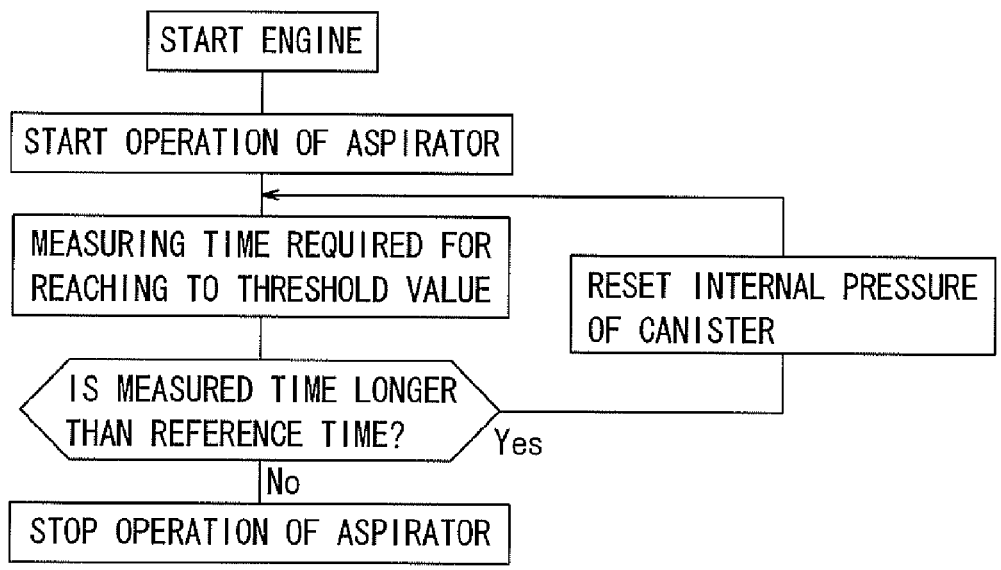
FIG. 5 is a flow chart of a control performed by the ECU according to the second example.
Figure 6:
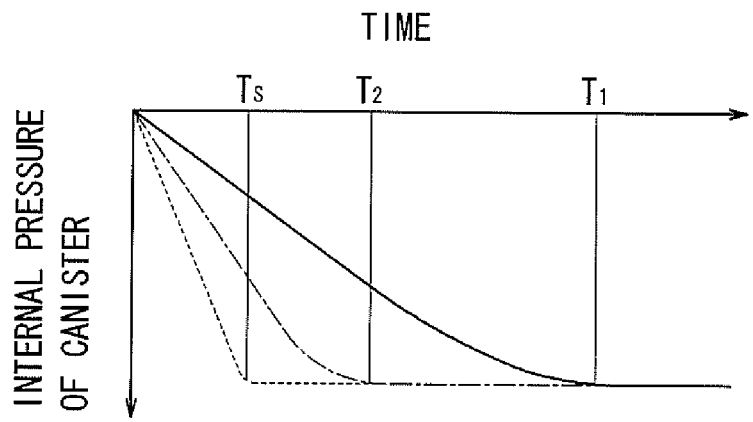
FIG. 6 is a schematic graph showing change of the internal pressure of the canister with time and showing a basis of determination made in the second example.

A second example will now be described with reference to FIGS. 5 and 6. In the first example, completion of recovery of the fuel vapor is determined if the negative pressure within the canister 2 has become stable. In the case of the second example shown in FIGS. 5 and 6, completion of recovery of the fuel vapor is determined based on the time that takes for the negative pressure within the canister 2 until reaching a threshold value. The threshold value is chosen such that the negative pressure starts to be stabilized after reaching the threshold value. The basic construction of the fuel vapor processing apparatus and the operation timings of various valves are the same as described in connection with the first example.

Because the fuel pump 3 and the aspirator 4 directly communicate with each other, the amount of the fuel introduced into the aspirator and the negative pressure produced by the aspirator may become stable. Therefore, variation in the internal pressure with time of the canister 2 exhibits a certain behavior depending on the value of the negative pressure produced by the aspirator 4 and on the capacity of the canister 2. Therefore, in the second example, a reference time Ts taken from starting application of the negative pressure into the canister 2 (on the condition that no fuel vapor is adsorbed within the canister 2) until reaching the threshold valve for starting to be stabilized (see dotted line in FIG. 6) is previously stored in the ECU 30.

Still, similar to the first example, the negative pressure sensor 7 monitors variation in the negative pressure within the canister 2 after starting the operation of the aspirator 4 following the start of the engine. Unlike the first example, as shown in FIG. 5, the ECU 30 measures the time that takes for the negative pressure within the canister 2 until reaching the threshold valve for starting to be stabilized. As the fuel vapor is adsorbed within the canister 2, the internal pressure within the canister 2 may gently decrease as indicated by solid line in FIG. 6, resulting in that time T1 required until reaching the threshold vale becomes longer than the reference time Ts. If the time T1 is longer than the reference time Ts, the atmospheric passage valve 22 is temporarily opened, so that the atmospheric air is introduced into the canister 2 from the atmospheric passage 12. As a result, the internal pressure of the canister 2 is reset to be equal to the atmospheric pressure. As soon as the internal pressure of the canister 12 is reset in this way, the atmospheric passage valve 22 is closed, so that the internal space of the canister 2 again becomes to be closed. Thereafter, the fuel vapor is desorbed from within the canister 2 defining the closed space, so that the internal pressure within the canister 2 gradually decreases. Because almost of the fuel vapor has been already desorbed by the previous desorption step, the rate of decrease of the internal pressure within the canister 2 becomes higher than the previous desorption step. However, because the previous desorption step was reset or stopped at the time T1 when reaching the threshold value, it may be possible that a small amount of the fuel vapor still remains in the canister 2. Therefore, time T2 required until reaching the threshold valve after restarting the desorption step may become loner than the reference time Ts although time T2 may be shorter than the time T1 of the previous desorption step. Also in this case, the atmospheric passage valve 22 is temporarily opened to reset the internal pressure of the canister 2, and the desorption step is repeated again. These steps are repeated until the time of reaching the threshold value becomes equal to the reference time Ts. The ECU 30 determines that the recovery of fuel vapor has been completed when the time required for reaching the threshold value has become equal to the reference time Ts. Then, the fuel introduction control valve 23 is closed to stop the operation of the aspirator 4.

Third Example

Figure 7:
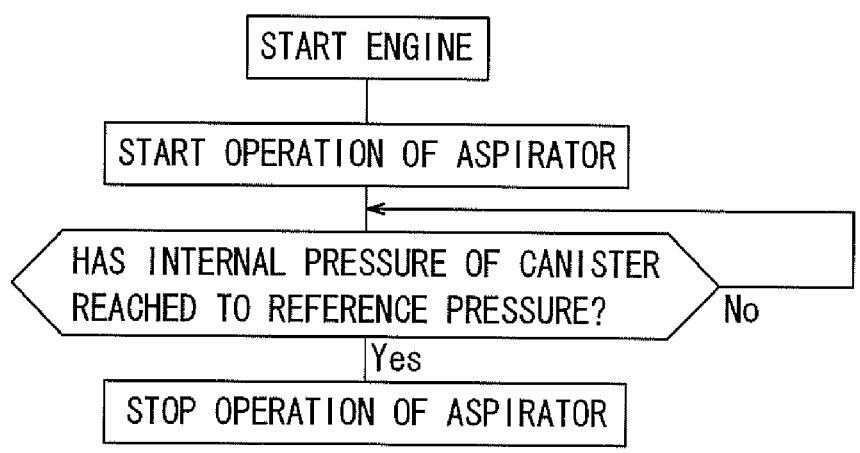
FIG. 7 is a flow chart of a control performed by the ECU according to the third example.
Figure 8:
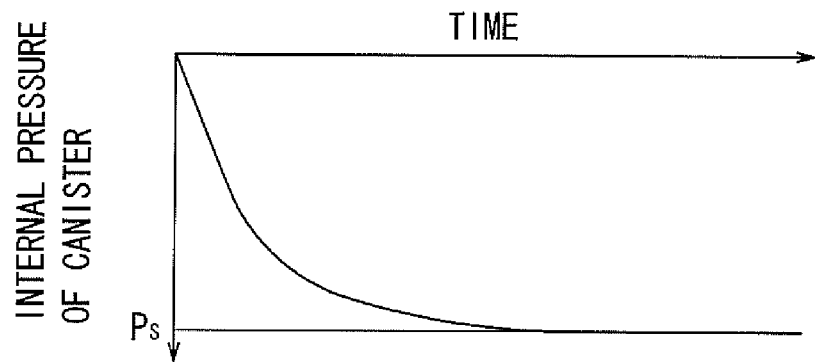
FIG. 8 is a schematic graph showing change of the internal pressure of the canister with time and showing a basis of determination made in the third example.

A third example will now be described with reference to FIGS. 7 and 8. In the third example, completion of recovery of the fuel vapor is determined if the negative pressure within the canister 2 has reached a reference pressure value. Also in the third example, the basic construction of the fuel vapor processing apparatus and the operation timings of various valves are the same as described in connection with the first example.

Because the fuel pump 3 and the aspirator 4 directly communicate with each other as in the case of the first and second examples, a saturation negative pressure (i.e., a value of the negative pressure at the time when the negative pressure is stabilized) within the canister 2 has a fixed value that is determined by the negative pressure produced by the aspirator 4 and the capacity of the canister 2. Therefore, in the third example, the CPU 30 previously stores a reference pressure Ps that is a saturation pressure achieved when the pressure within the canister 2 is stabilized after the fuel vapor has been desorbed as much as possible. When the negative pressure sensor 7 detects an event that the negative pressure within the canister 2 has reached the reference pressure Ps, the CPU 30 determines that the recovery of fuel vapor has been completed. Then, the fuel introduction control valve 23 is closed to stop the operation of the aspirator 4.

Fourth Example

A fourth example will now be described with reference to FIG. 9 that shows a fuel vapor processing apparatus according to the fourth example. The fuel vapor processing apparatus of the fourth example is a modification of the fuel vapor processing apparatus of the first example. Therefore, in FIG. 9, like members are given the same reference signs as the first example, and the description of these members will not be repeated.

Figure 9:
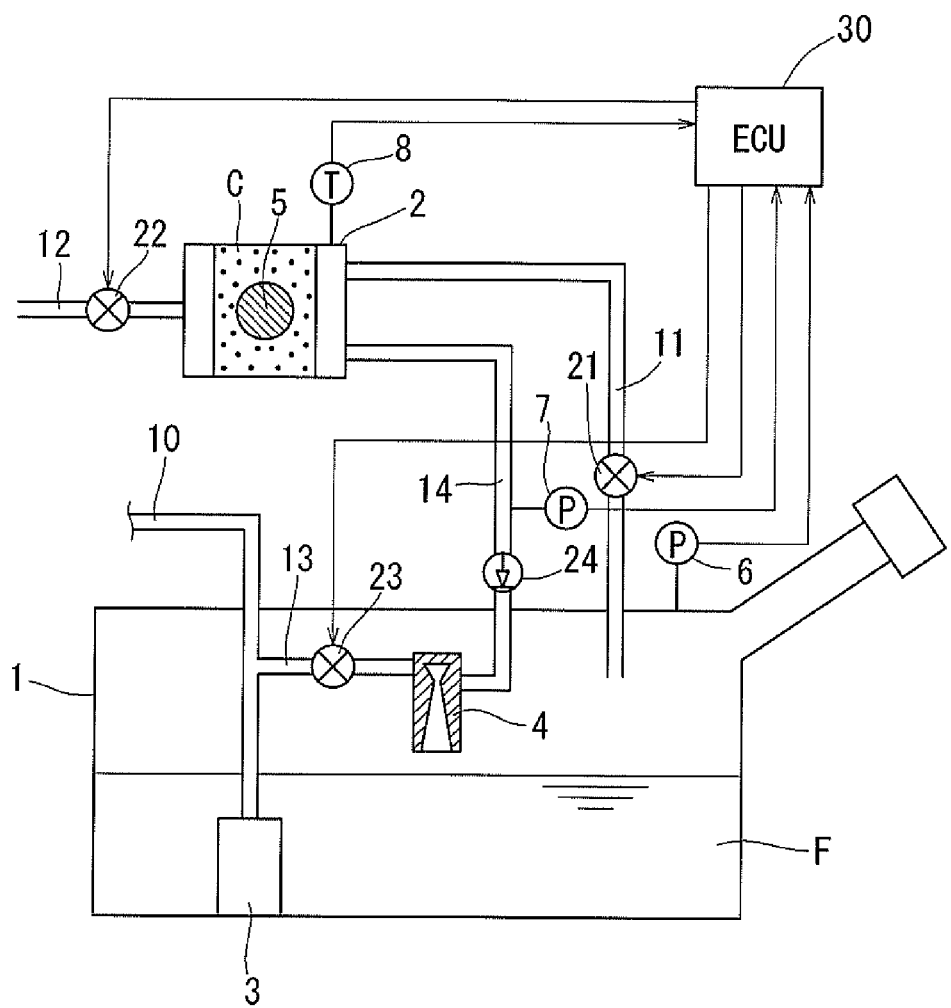
FIG. 9 is a schematic view showing a fuel vapor processing apparatus according to a fourth example.

In the fuel vapor processing apparatus of FIG. 9, a temperature sensor 8 is provided for detecting the temperature within the canister 2. The temperature of the adsorption material C decreases as the fuel vapor is desorbed. Therefore, as long as the fuel vapor is contained in the canister 2, the temperature within the canister 2 decreases as the fuel vapor is recovered. On the other hand, after the fuel vapor has been completely recovered, the temperature may not decrease further. To this end, the temperature sensor 8 is provided at the canister 2 for outputting a detection signal to the ECU 30. During the recovery of the fuel vapor, the temperature sensor 8 monitors variation in temperature, while the negative pressure sensor 7 monitors the negative pressure within the canister 2. At the time when the completion of recovery of the fuel vapor is determined based on the detection signal from the negative pressure sensor 7 as in the first to third examples, it is also determined if the temperature drop within the canister 2 has been stopped. Thus, the recovery process is continued until the temperature drop is stopped even after the internal pressure within the canister 2 has been stabilized. In other words, the ECU 30 determines that the recovery of fuel vapor has been completed if the negative pressure within the canister 2 has been stabilized and if it has been detected an event that the temperature drop is stopped. Because the completion of recovery of fuel vapor is determined based on the temperature information in addition to the pressure information, determination accuracy may be improved and it is possible to reliably prevent insufficient recovery of the fuel vapor.

The temperature sensor 8 may be provided in the recovery passage 14 instead of providing at the canister 2. However, in such a case, the temperature sensor 8 may preferably be positioned closer to the canister 2, and more preferably, it may be positioned directly below the canister 2. Also, in the case that the temperature sensor 8 is provided at the canister 2, the temperature sensor 8 may preferably positioned closer to a connecting portion with the recovery passage 14 (i.e., a recovery passage port). With these arrangements, it is possible to further improve the detection accuracy of the temperature within the canister 2.

Fifth Example

The above examples may be modified in various ways. In particular, the teachings of the above examples can be applied to any other fuel vapor processing apparatus as long as these apparatus have a basic construction including a fuel tank, a canister and an aspirator. Thus, the fuel vapor processing apparatus may have any other components other that those described in the above examples.

Figure 10:
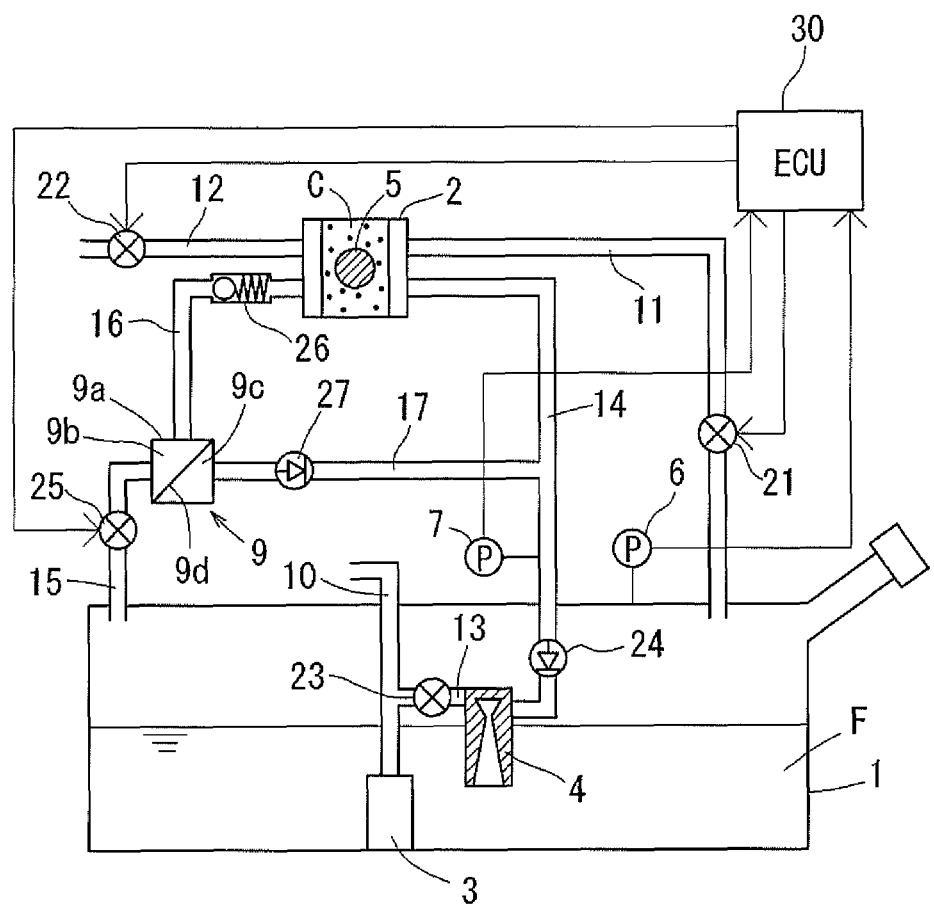
FIG. 10 is a schematic view showing a fuel vapor processing apparatus according to a fifth example.

For example, the above teachings can be applied to a fuel vapor processing apparatus according to a fifth example shown in FIG. 10. The fuel vapor processing apparatus of the fifth example has a separation membrane for preferentially separating and condensing a specific component from a mixture of a plurality of different kinds of gases. In FIG. 10, like members are given the same reference signs as FIG. 1, and the description of these members will not be repeated.

In the case of the fifth example shown in FIG. 10, a separation membrane module 9 is provided in addition to the basic construction of the fuel vapor processing apparatus of FIG. 1. The separation module 9 includes a substantially sealed container 9a and a separation membrane 9d separating the inner space of the sealed container 9a into an introduction chamber 9b and a permeation chamber 9c. In this example, a membrane used for the separation membrane 9d is chosen to have a high resolving and diffusing efficiency for the fuel component and can preferentially allow permeation or passage of a fuel component, while inhibiting passage of an air component. A process vapor passage 15 extends from the fuel tank 1 and is connected to the introduction chamber 9b of the separation membrane module 9. A process vapor passage valve 25 is provided in the process vapor passage 15 and serves as an opening and closing device for switching between a communicating condition and an interrupting condition of the process vapor passage 15. Further, one end of a diluted gas passage 16 is connected to the introduction chamber 9b of the separation membrane module 9, so that the diluted gas that has not passed through the separation membrane 9d flows into the diluted gas passage 16. The other end of the diluted gas passage 16 is connected to the canister 2. A pressure control valve 26 is provided in the midway of the diluted gas passage 16. The pressure control valve 26 is a check valve allowing the flow of the gas only in a direction from the separation membrane module 9 toward the canister 2. The pressure control valve 26 is opened when a predetermined gas pressure is applied from the side of the separation membrane module 9. One end of a condensed gas passage 17 is connected to the permeation chamber 9c of the separation membrane module 9, so that the condensed gas condensed and separated by the separation membrane 9d can flow into the condensed gas passage 17. The other end of the condensed gas passage 17 is connected to the recovery passage 15. A check valve 27 is provided in the condensed gas passage 17 for allowing the flow of the gas only in a direction from the separation membrane module 9 toward the aspirator 4.

In the case of the fuel vapor processing apparatus of this example, the process vapor passage valve 26 is opened at the same time that the fuel introduction control valve 23 is opened during processing the fuel vapor as in the case of the first to third examples. Therefore, a fuel vapor containing gas containing fuel vapor that may be produced in the fuel tank 1 during recovery of the fuel vapor from the canister 2 by the aspirator 4 is introduced into the introduction chamber 9b of the separation membrane module 9 through the process vapor passage 15. Then, the fuel component contained in the fuel vapor containing gas preferentially passes through the separation membrane 9d so as to be separated, so that a condensed gas is produced in the permeation chamber 9c. During this process, a negative pressure is applied to the permeation chamber 9c by the aspirator 4, and therefore, a difference in pressure exists between the introduction chamber 9b and the permeation chamber 9c. As a result, the fuel vapor can be effectively separated. The condensed gas is discharged and recovered into the fuel tank 1 through the condensed gas passage 17, the recovery passage 14 and the aspirator 4. On the other hand, the diluted gas primarily containing air and remaining within the introduction chamber 9b without passing through the separation membrane 9d is introduced into the canister 2 through the diluted gas passage 16, so that desorption of the fuel vapor from the canister 2 can be enhanced. During this process, the canister 2 is kept at a negative pressure by the pressure control valve 26.

Also in the fuel vapor processing apparatus having the separation membrane module 9, it may be possible to provide the temperature sensor 8 as provided in the fourth example. Therefore, in such a case, it is possible to determine the completion of recovery of the fuel vapor based on the detection signal from the negative pressure sensor 7 and the detection signal from the temperature sensor 8 as in the fourth example.

Sixth Example

Figure 11:
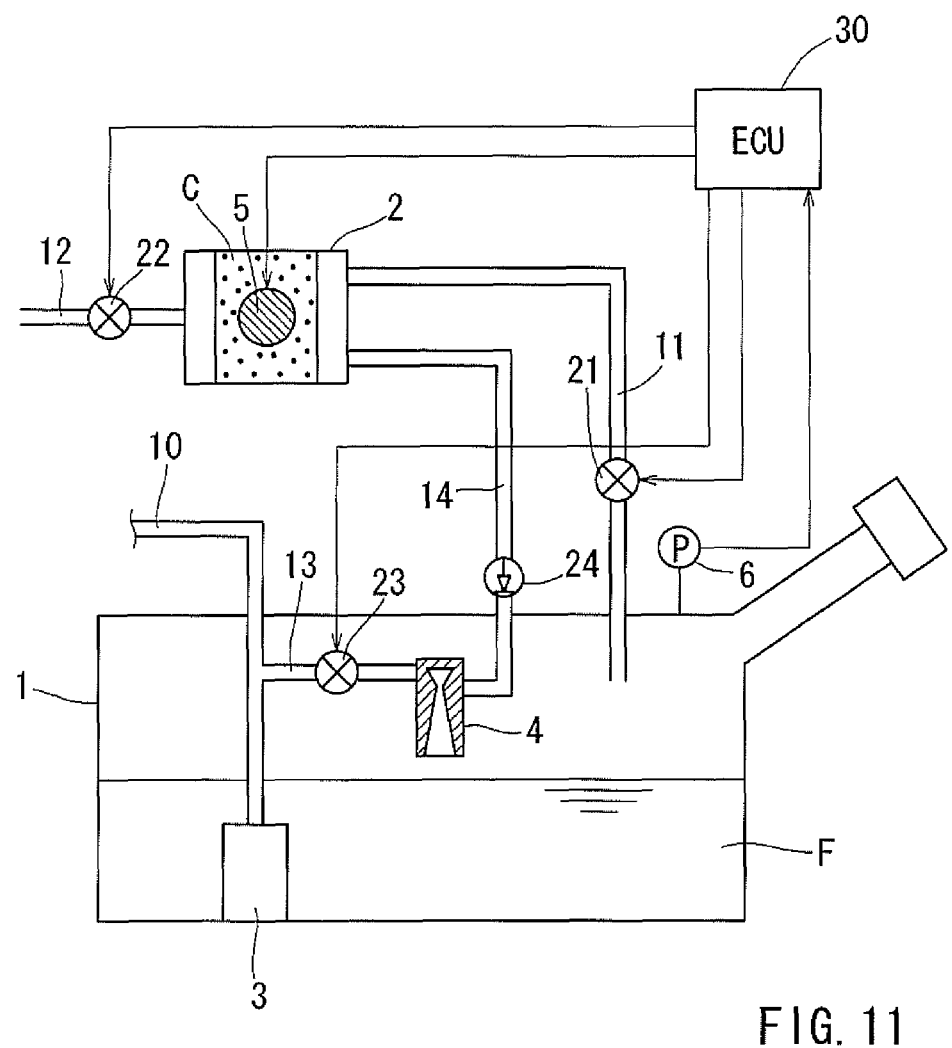
FIG. 11 is a schematic view showing a fuel vapor processing apparatus according to a sixth example.

A sixth example will now be described with reference to FIGS. 11 to 13. A fuel vapor processing apparatus according to the sixth example is shown in FIG. 11 and is different from different from the fuel processing apparatus of the first example shown in FIG. 1 in the following points. First, the apparatus of FIG. 11 does not include the negative pressure sensor 7. Second, the control performed by the ECU 30 is different from that of the first example. To this end, the ROM of the ECU previously stores a map showing the amount of adsorption of the fuel vapor by the canister 2 in relation to an accumulative operation time as will be explained later. In other respect, the fuel processing apparatus of the sixth example is the same as that of the first example.

A process mechanism of the fuel vapor processing apparatus of this example will now be described. Also in this example, the CPU 30 performs all the controls that will be described below. During the parking of the automobile, the atmospheric passage valve 22 is opened, while the adsorption vapor passage valve 21 and the fuel introduction control valve 23 are closed. On the other hand during filling of fuel into the fuel tank 1, the adsorption vapor passage valve 21 is opened. The adsorption vapor passage vale 21 also may be opened when the pressure sensor 6 detects an event that the internal pressure of the fuel tank 1 exceeds a predetermined value (e.g., 5 kPa), for example, due to increase of fuel temperature that may be caused with increase of the external temperature. With this selective opening of the adsorption vapor passage vale 21, the fuel vapor can be selectively adsorbed or captured by the adsorption material C within the canister 2. The remaining air may pass through the adsorption material C and is thereafter dissipated into the atmosphere via the atmospheric passage 12. Therefore, the pressure within the fuel tank 1 can be released to prevent potential damage of the fuel tank 1 while atmospheric pollution can be avoided. The adsorption vapor passage valve 21 is closed when the pressure sensor 6 detects an event that the internal pressure within the fuel tank 1 has been lowered to a predetermined pressure (e.g., the atmospheric pressure). These operations are the same as in the case of the first example.

Figure 12:
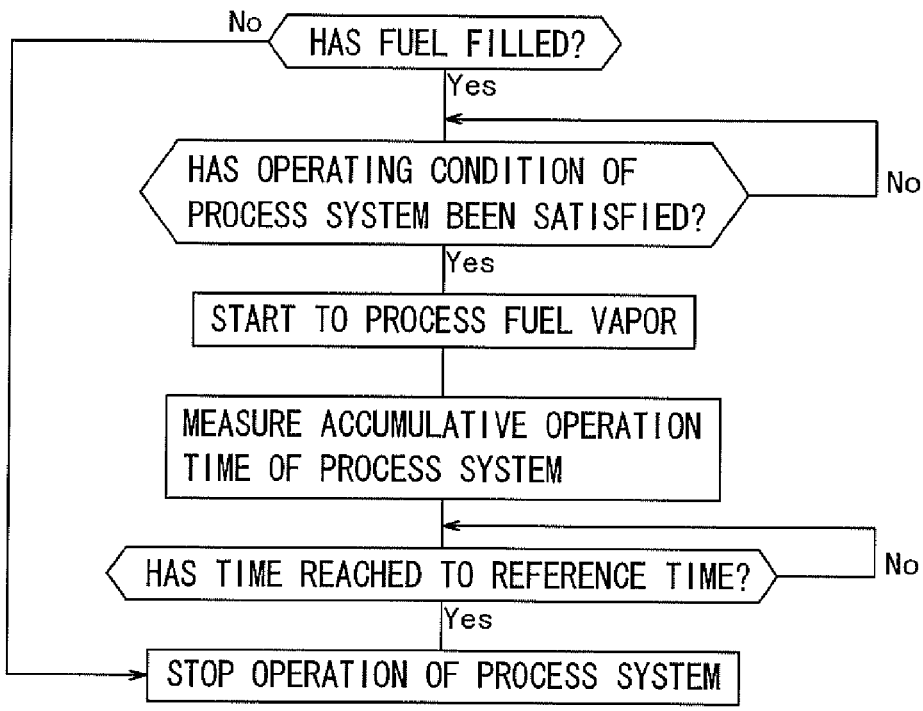
FIG. 12 is a flowchart of a control performed by a fuel vapor process system (ECU) of the sixth example.
Figure 13:
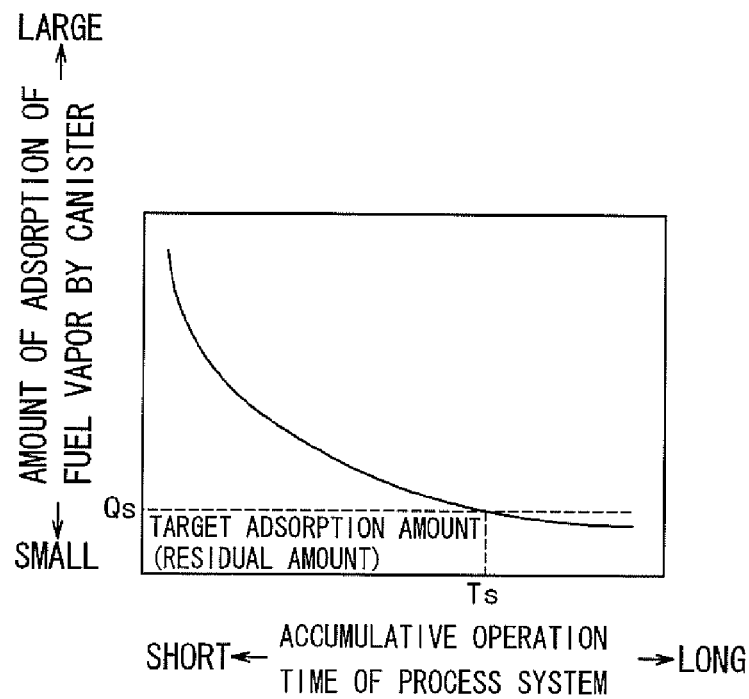
FIG. 13 shows a schematic graph showing change of a fuel vapor adsorption amount with time.

In this example, a fuel vapor process system starts to operate after the fuel filling operation is finished as shown in FIG. 12. More specifically, the fuel vapor process system starts to operate for desorbing and recovering the fuel vapor from the canister 2 when a process system starting condition is satisfied after the fuel filing operation. Typically, the process system starting condition may require that the engine has started. Alternatively, the starting condition may require that a predetermined time has elapsed after finishing the fuel filling operation, regardless of starting of the engine. If the starting condition is satisfied, the fuel pump 3 is operated, and at the same time, the fuel introduction control valve 23 is opened. Then, a part of fuel F discharged from the fuel pump 3 is introduced into the aspirator 4 via the fuel supply passage 10 and the branch passage 13. If the engine has not been started at that time, surplus fuel is released from the pressure regulator (not shown) into the fuel tank 1. As the fuel is introduce from the fuel tank 1 into the aspirator 4, a negative pressure is produced at the aspirator 4 and is applied to inside of the canister 2 through the recovery passage 14. The heater 5 is heated simultaneously with the operation of the aspirator 4. In addition, simultaneously with opening the fuel introduction control valve 23, the atmospheric passage valve 22 is closed. Because the adsorption vapor passage valve 21 is still closed, the inside of the fuel tank 1 and the inside of the canister 2 are brought to be closed spaces.

As the negative pressure from the aspirator 4 is applied to inside of the canister 2, fuel vapor adsorbed by the adsorption material C within the canister 2 is drawn to be desorbed. The desorbed fuel vapor is recovered into the fuel tank 1 via the recovery passage 14 and the aspirator 4. Therefore, as shown in FIG. 13, the adsorption amount (residual amount) of the fuel vapor within the canister 2 gradually decreases with time. Because the heater 5 heats the adsorption material C, desorption and recovery of the fuel vapor can be enhanced. During this process, the ECU 30 continuously counts an accumulative operation time. In addition, the ECU 30 previously stores a map showing the amount of adsorption of the fuel vapor by the canister 2 in relation to an accumulative operation time as shown in FIG. 13. Therefore, the ECU 30 can identify the residual amount of the fuel vapor based on the map by simply counting the accumulative operation time. In addition, the ECU 30 stores a reference time Tss at which time the residual amount of the fuel vapor within the canister 2 reaches a target adsorption amount (or a target residual amount) Qs. Therefore, the operation of the process system is stopped when the accumulative operation time has reached to the reference time Tss. In other words, once the process system is operated, the process system continues to operate by the reference time Ts even in the case that the engine is stopped during the operation of the process.

The operation of the process system is stopped when the fuel introduction control valve 23 is closed to stop the operation of the aspirator 4. If the engine is still operating at the time when reaching the reference time Tss, the fuel pump 3 is also naturally still operating. On the other hand, if the engine is stopped at the time when reaching the reference time Tss, the fuel pump 3 is also stopped. When the operation of the process system is stopped, the supply of an electric power to the heater 5 is also stopped. Thus, after stopping the operation of the process system, no electric power is supplied to the heater 5 and to the fuel pump 3 depending on the situation. Therefore, it is possible to avoid unnecessary consumption of the electric power. Although there is no particular limitation to the value of the target residual amount Qs, it may be preferable that the target residual amount Qs is as smaller as possible. Thus, if the residual amount of the fuel vapor is large, there is a possibility that the fuel vapor is dissipated from the canister 2 into the atmosphere, for example, during parking of the automobile. For this reason, the target residual amount Qs may preferably be set to about 1 vol % in concentration and more preferably about 0.5 vol %.

After the operation of the aspirator 4 has been stopped, it may be possible that the fuel may cause backflow from the aspirator 4 into the canister 2 because the inside of the canister 2 and the inside of the recovery passage 14 may still have a negative pressure. However, the check valve 24 may prevent potential backflow of fuel F from the aspirator 4 into the canister 2. Further, during processing of the fuel vapor, it may be possible that the fuel temperature increases due to increase of the external temperature or a heat produced during the operation of the fuel pump 3. However, when the pressure sensor 6 detects an event that the internal pressure of the fuel tank 1 has increased to be higher than a predetermined value, the adsorption vapor passage 21 and the atmospheric passage valve 22 are opened, so that the internal pressure of the fuel tank 1 is released. The accumulative operation time Tss may be reset simultaneously with stopping the operation of the process system or may be reset immediately after the fuel filling operation has been finished.

Seventh Example

Figure 14:
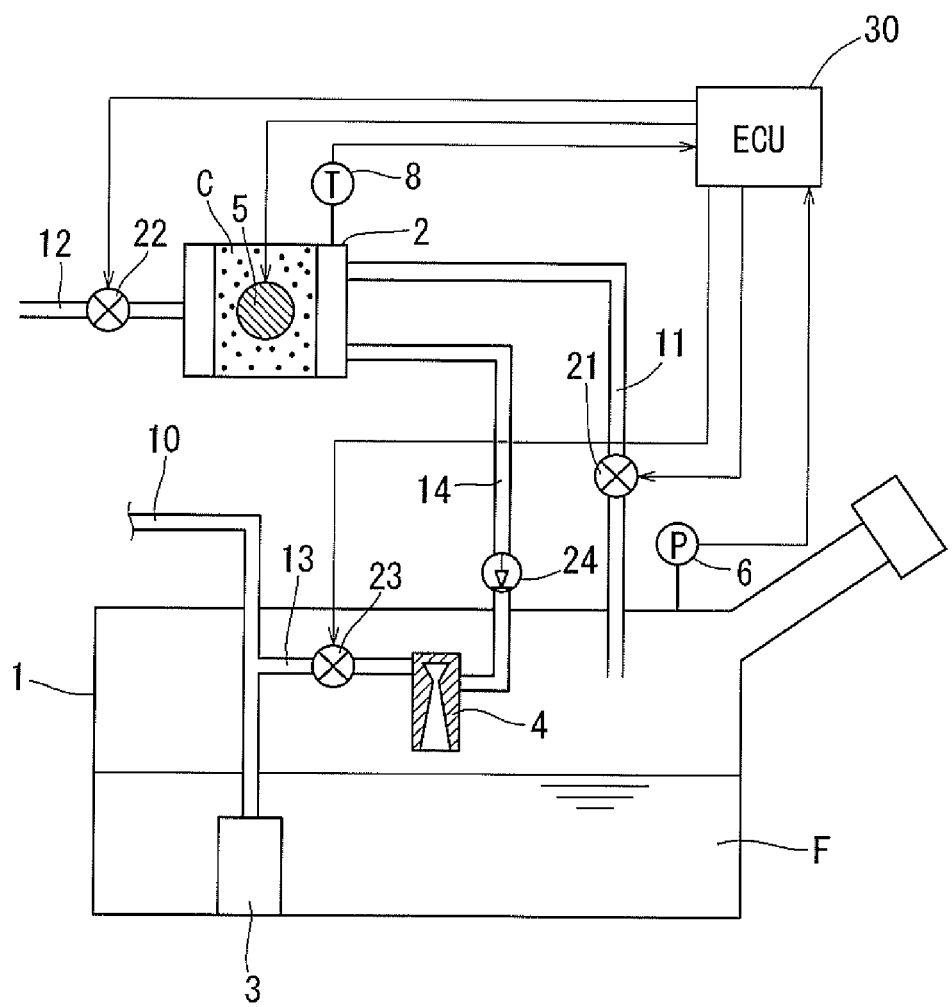
FIG. 14 is a schematic view showing a fuel vapor processing apparatus according to a seventh example.

A seventh example will now be described with reference to FIGS. 14 to 16. The seventh example is a modification of the sixth example. A fuel vapor processing apparatus of this example shown in FIG. 14 is different from the fuel vapor processing apparatus of the seventh example shown in FIG. 11 in that a temperature sensor 8 that is the same as the temperature sensor 8 of the fourth example shown in FIG. 9 is provided. Therefore, in FIG. 14, like members are given the same reference signs as FIG. 11 (or FIG. 1), and the description of these members will now be repeated. In addition, the explanation of the seventh example will be mainly focused on points that are different from the sixth example.

In the case of the sixth example, the fuel vapor residual amount is detected independently of the temperature within the canister 2. However, it may be possible that the desorption rate of the fuel vapor (i.e., a reduction rate with time of the fuel vapor adsorbing amount) varies with the temperature within the canister 2. More specifically, the lower the temperature within the canister 2, the gentler the fuel vapor residual amount decrease as indicated by a chain line in FIG. 16. On the other hand, the higher the temperature within the canister 2, the more abruptly the fuel residual amount decreases as indicated by a dotted line in FIG. 16. Therefore, the reference time Tss required for reaching to the target adsorption amount Qs may vary with the temperature within the canister 2. According to the seventh example, a map showing different values or characteristics of the fuel vapor adsorption amount in relation to different values of the temperature within the canister 2 is previously stored in the ECU 30. Here, the term "temperature" used in connection with the map is a temperature varying with the external temperature. The heating temperature of the heater 5 is not necessary to be considered because the quantity of heat produced by the heater 5 does not change with the temperature within the canister 2.

Figure 15:
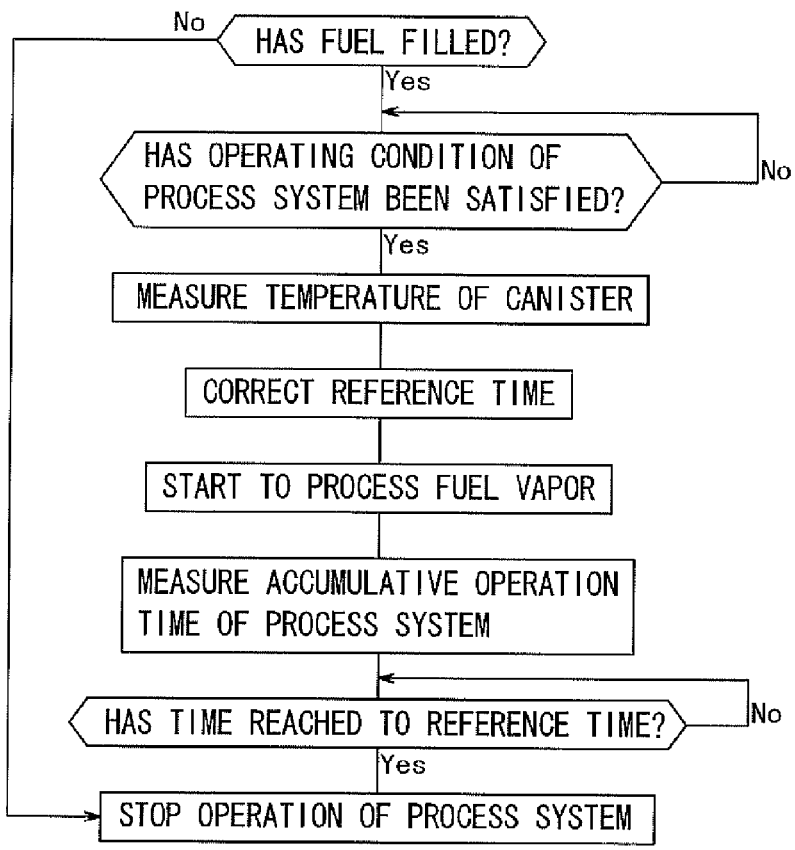
FIG. 15 is a flowchart of a control performed by a fuel vapor process system (ECU) of the seventh example.
Figure 16:
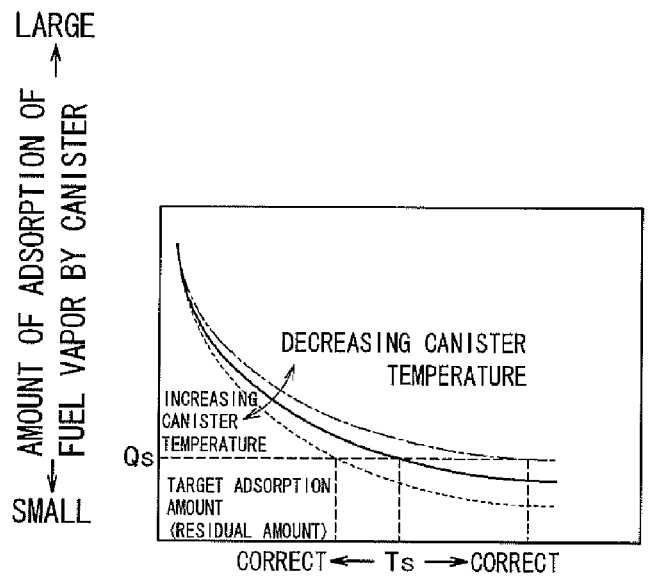
FIG. 16 is a schematic graph showing change of a fuel vapor adsorption amount with time in the seventh example.

On the above presumption, if the condition for starting the operation of the fuel vapor process system is satisfied as described in the sixth example, the temperature sensor 8 detects the temperature within the canister 2 as an initial temperature prior to starting the process system as shown in FIG. 15. The detected initial temperature is then inputted into the ECU 30, so that the ECU 30 refers to the map showing the variation of the fuel vapor adsorption amount similar to that shown in FIG. 16 in order to make a correction for increasing or decreasing the reference time Tss required for reaching to the target adsorption amount Qs according to the detected initial temperature within the canister 2. Thereafter, the process system starts to operate for performing the fuel vapor recovery process in the same manner as described in connection with the sixth example. According this example, it is possible to reliably accurately achieve the target adsorption amount Qs without being influenced by the change of temperature within the canister 2. In particular, even in the case that the temperature within the canister 2 is low due to the external environmental condition, it is possible to reliably reduce the fuel vapor residual amount to be equal to or lower than the target adsorption amount Qs. On the other hand, in the case that the temperature within the canister 2 is high due to the external environmental condition, the reference time Tss is decreased. Therefore, the operation of the process system is stopped earlier, so that unnecessary consumption of an electric power can be further reduced.

Eighth Example

Figure 17:
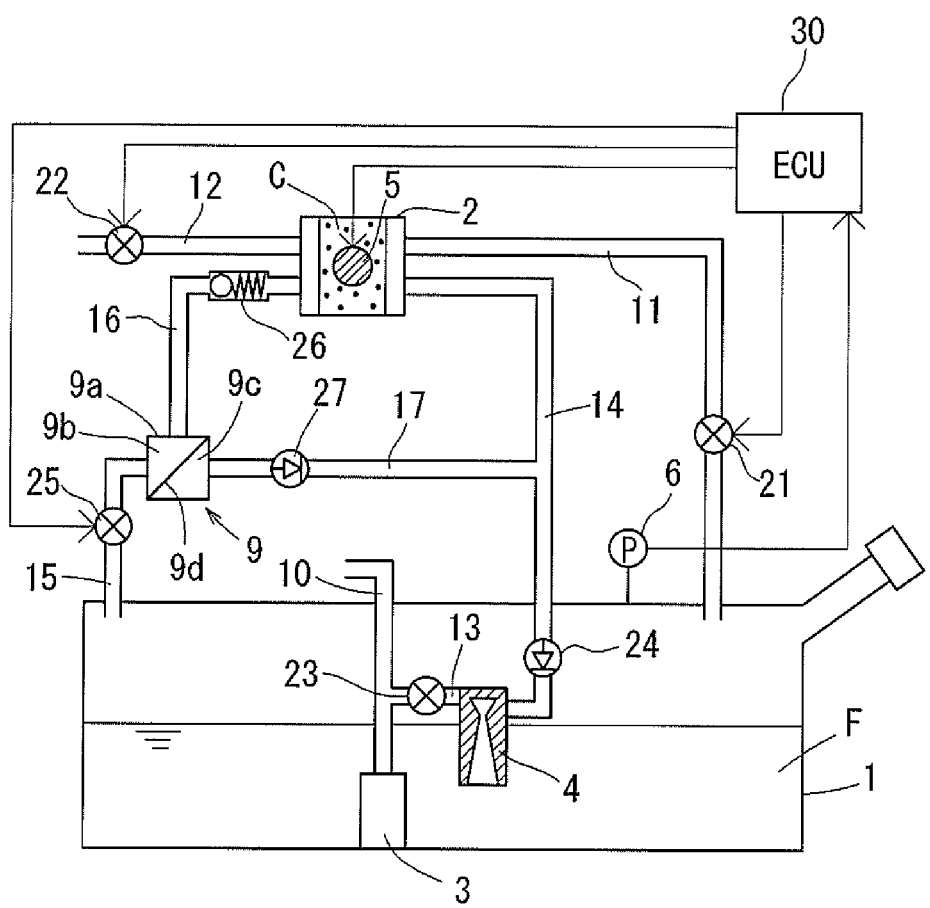
FIG. 17 is a schematic view showing a fuel vapor processing apparatus according to an eighth example.
Figure 18:
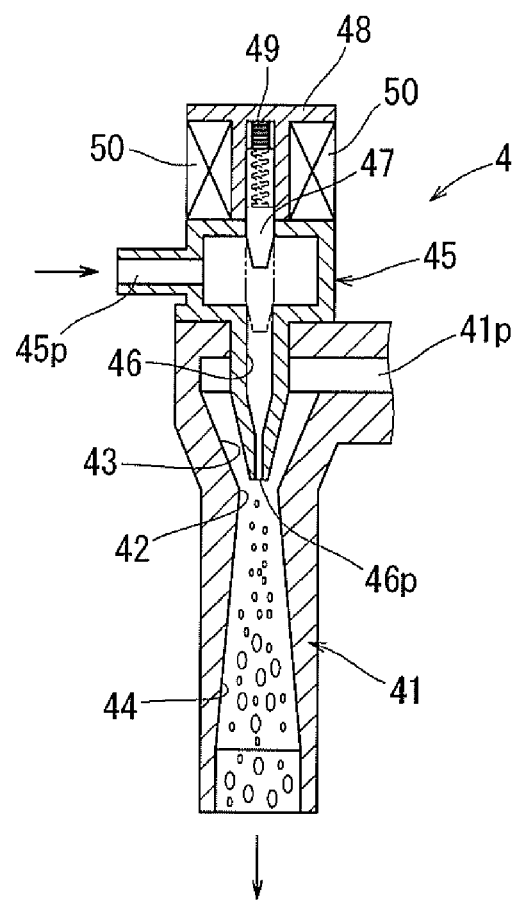
FIG. 18 is a vertical sectional view of an aspirator according to a ninth example.

A fuel vapor processing apparatus according to an eighth example is shown in FIG. 17. This example is a modification of the sixth example and is different from the sixth example in the provision of the separation membrane module 9 and its related passages 15, 16 and 17 and valves 25, 26 and 27 as provided in the case of the fifth example shown in FIG. 10. The constructions and the operations of the separation membrane module 9 and its related passages 15, 16 and 17 and valves 25, 26 and 27 are the same as those described in connection with the fifth example.

According to the eighth example, in addition to the operations and advantages as described in connection with the sixth example, it is possible to enhance the desorption of the fuel vapor form the canister 2 by the diluted gas introduced into the canister 2 from the separation membrane module 9 via the diluted gas passage 16 as discussed in the eighth example.

As an alternative arrangement of the eighth example, the temperature sensor 8 as in the seventh example may be provided, so that it is possible to correct the reference time Tss based on the temperature information from the temperature sensor 8 as in the seventh example.

Ninth Example

Although the fuel introduction control valve 23 is provided in the branch passage 13 in the above examples, the fuel introduction control valve may be provided in the aspirator According to a sixth example shown in FIG. 17, a needle valve 47 is provided in the aspirator 4. The needle valve 47 can control the timing of injecting fuel from the nozzle body 46. More specifically, a valve installation base 48 is joined to the nozzle portion 45. The needle valve 47 is disposed centrally of the valve installation base 48 and can open and close the nozzle body 46. The needle valve 47 is slidably supported within the valve installation base 48 and can move in the axial direction of the aspirator 4. A compression spring 49 is interleaved between the needle valve 47 and the valve installation base 48 for normally biasing the needle valve in a closing direction for closing the nozzle body 46. An electric magnet 50 is mounted within a peripheral portion of the valve installation base 48 so as to surround the needle valve 47. When the electric magnet 50 is exited under the control of the CPU 30, the electric magnet 50 attracts the needle valve 47, so that the needle valve 47 moves in an opening direction for opening the nozzle body 46.

What is claimed is:

1. A fuel vapor processing apparatus comprising:
    a fuel tank;
    a canister capable of adsorbing fuel vapor produced in the fuel tank;
    a fuel pump disposed within the fuel tank;
    an aspirator configured to produce a negative pressure by a part of fuel discharged from the fuel pump and introduced into the aspirator, so that the fuel vapor adsorbed by the canister can be recovered into the fuel tank by utilizing the negative pressure;
    a pressure sensor detecting a pressure within the canister;
    a determination device configured to determine completion of recovery of the fuel vapor from within the canister based on information detected by the pressure sensor; and
    an introduction stop device configured to stop introduction of the part of fuel into the aspirator based on the determination made by the determination device.

2. The fuel vapor processing apparatus as in claim 1, wherein:
    the fuel pump and the aspirator directly communicate with each other;
    the introduction stop device comprises a fuel introduction control valve configured to control introduction of the part of fuel from the fuel pump into the aspirator; and
    the fuel introduction control valve is closed to stop introduction of the part of fuel into the aspirator if the determination device determines that recovery of the fuel vapor has been completed.

3. The fuel vapor processing apparatus as in claim 1, wherein the determination device determines that recovery of the fuel vapor has been completed if a negative pressure within the canister has been stabilized.

4. The fuel vapor processing apparatus as in claim 1, wherein the determination device determines that recovery of the fuel vapor has been completed if a time required for a negative pressure within the canister until reaching to a threshold value for starting to be stabilized has become equal to or less than a reference time.

5. The fuel vapor processing apparatus as in claim 1, wherein the determination device determines that recovery of the fuel vapor has been completed if a negative pressure within the canister has reacted a reference pressure that is previously set.

6. The fuel vapor processing apparatus as in claim 1, further comprising a temperature sensor capable of detecting a temperature within the canister, and the determination device determines the completion of recovery of the fuel vapor from within the canister based on the information detected by the temperature sensor in addition to the information detected by the pressure sensor.

7. The fuel vapor processing apparatus as in claim 1, further comprising a heater disposed within the canister, wherein the heater generates heat during recovering of the fuel vapor.

8. The fuel vapor processing apparatus as in claim 1, further comprising a recovery passage communicating between the canister and the fuel tank, wherein the pressure sensor is provided in the recovery passage.

9. A fuel vapor processing apparatus comprising:
    a fuel tank;
    a canister capable of adsorbing fuel vapor produced in the fuel tank;
    a fuel pump disposed within the fuel tank;
    an aspirator configured to produce a negative pressure by a part of fuel discharged from the fuel pump and introduced into the aspirator, and
    a system controller configured to control the operation of a process system of the fuel vapor, the process system being configured to recover the fuel vapor adsorbed by the canister into the fuel tank by utilizing the negative pressure produced by the aspirator;
    wherein the system controller stops the operation of the process system upon determination of an event that an amount of the fuel vapor adsorbed within the canister has become equal to or less than a predetermined value.

10. The fuel vapor processing apparatus as in claim 9, wherein:
    the fuel pump and the aspirator directly communicate with each other;
    the system controller determines an amount of the fuel vapor absorbed within the canister based on an accumulative operation time of the process system elapsed after starting the operation of the process system.

11. The fuel vapor processing apparatus as in claim 1, wherein:
    the system controller has a map stored therein, the map showing variation in an amount of the fuel vapor adsorbed within the canister in relation to an accumulative operation time of the process system, and
    the system controller determines the amount of the fuel vapor adsorbed within the canister based on the map.

12. The fuel vapor processing apparatus as in claim 10, wherein the system controller stops the operation of the process system when the accumulative operation time of the process system has become equal to a reference time.

13. The fuel vapor processing apparatus as in claim 10, wherein the operation of the process system is started in response to finishing of filling of fuel into the fuel tank.

14. The fuel vapor processing apparatus as in claim 12, further comprising a temperature sensor configured to detect a temperature within the canister, wherein the system controller is configured to correct the reference time based on the temperature detected by the temperature sensor.

15. The fuel vapor processing apparatus as in claim 9, further comprising a heater configured to heat inside of the canister, and wherein the system controller is configured to operate the heater in response to the operation of the process system and to stop the operation of the heater in response to stopping of the operation of the process system.

16. A fuel vapor processing apparatus comprising:
   a fuel tank;
   a canister capable of adsorbing fuel vapor produced in the fuel tank;
   a fuel pump disposed within the fuel tank;
   a fuel recovery device configured to recover the fuel vapor from the canister into the fuel tank; and
   a control device configured to stop recovery of the fuel vapor by the fuel recovery device based on at least one of parameters representing the amount of the fuel vapor remaining within the canister.

17. The fuel vapor processing apparatus as in claim 16, wherein the at least one of parameters includes a pressure within the canister.

18. The fuel vapor processing apparatus as in claim 16, wherein the at least one of parameters includes a temperature within the canister.

19. The fuel vapor processing apparatus as in claim 16, wherein the at least one of the parameters includes a time elapsed after starting recovery of the fuel vapor.

\* \* \* \* \*